Figure 1:
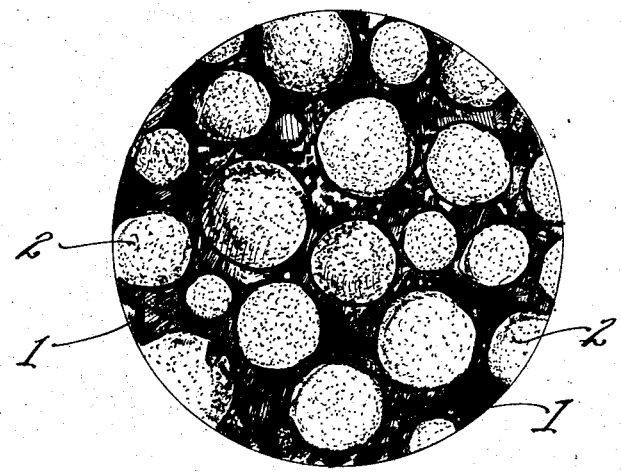

June 21, 1927.  1,633,095

R. H. HANDY

WOOD PRESERVATIVE

Filed Feb. 3, 1925

Patented June 21, 1927.

1,633,095

UNITED STATES PATENT OFFICE.

RALPH HOWARD HANDY, OF BERKELEY, CALIFORNIA.

WOOD PRESERVATIVE.

Application filed February 3, 1925. Serial No. 6,650.

This invention relates to an improved wood preservative in the form of an emulsion particularly adapted to perform wood preserving functions as hereafter described. Due to their contact with the ground and the absorbing of moisture therefrom and the contracting of fungus diseases, such wood bodies as railroad ties, telephone poles, etc., quickly become affected and decay. To prevent this action and preserve the wood, these bodies are now very commonly treated with a wood preservative. There are many of such preservatives now in use, most of which have an oil base. It is the primary object of my invention to provide an improved wood preservative in the form of a water-in-oil emulsion containing wood preserving antiseptics.

A wood preservative, to be most effective, should have the following characteristics:

(1) Should be antiseptic.
(2) Should exclude air and moisture.
(3) Should be capable of giving up its antiseptic preservative in sufficient quantities to kill hostile fungi, and
(4) Should be capable of preventing the leaching out and deterioration of this antiseptic as long as possible.

It is a further object of my invention to provide an improved wood preservative embodying these characteristics.

With the above and other objects in view, my invention consists of the improved product and process defined herein and illustrated in the accompanying drawing. It should be understood, however, that the invention is not to be limited to the specific details defined herein, the scope of the invention being defined in the appended claims.

Figure 2:
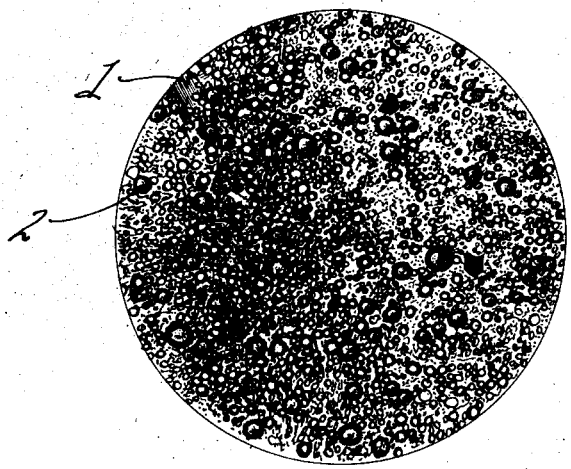

In the figures of the drawing:

Fig. 1 illustrates a portion of my improved emulsion having as one of its components a fuel oil of 28° A. P. I. or 28 gravity and, Fig. 2 is a like view illustrating the emulsion having as one of its components a fuel oil of 17° A. P. I. or 17 gravity, both such views being illustrated as magnified 100 diameters.

Certain chemical salts such, for example, as zinc chloride, copper sulphate, mercuric chloride, sodium fluoride, etc. are highly antiseptic to wood destroying fungi.

Likewise, the tar acids, cresylic acid, carbolic acid, beta naphthol, creosote, etc., which are miscible with oil, are antiseptic to wood destroying fungi.

My invention contemplates an oil-water emulsion containing certain of these antiseptics, as illustrated in the accompanying drawing. This emulsion is to be of the water-in-oil type wherein the water is the dispersed phase and the oil is the continuous phase. The water thereof will always be an antiseptic salt solution and the oil may or may not contain an antiseptic as desired.

The quantities of antiseptic used in the emulsion depend quite materially upon the condition and the purpose for which the preservative is to be used. The particular antiseptic or antiseptics used will depend most generally on the commercial prices of the different antiseptics which can be used. The water will always have some antiseptic in solution though this may be a weak solution if desired. The oil may have no antiseptic or any amount desired. The emulsion may, therefore, comprise a water solution strongly antiseptic and little or no antiseptic in the oil, or the water may be a weak antiseptic solution and the oil correspondingly strong with an antiseptic. Briefly, therefore, it is only necessary that the emulsion should be antiseptic and this antiseptic can be placed wherever the same seems cheapest and most desirable.

It will be understood that my invention contemplates an emulsion of the above type and the manufacture thereof by any of the various possible methods. One of the preferred methods which I have devised for producing an emulsion of this type is by the use of zinc hydroxide as the emulsifying agent. This zinc hydroxide is in this method obtained by the chemical reaction between zinc chloride and ammonium hydroxide, the ammonium hydroxide being added to a water solution of zinc chloride and the chemical reaction being as follows:

$$ZnCl_2 + 2NH_4OH = Zn(OH)_2 + 2NH_4Cl$$

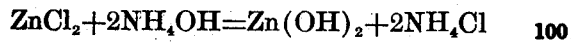

The amount of zinc chloride added to the water in making zinc chloride solution may be sufficiently antiseptic to form the particular emulsion desired. However, more zinc chloride or any other desired water soluble antiseptic salts may be added to the resulting zinc chloride solution which as above shown contains zinc hydroxide. The emulsion is then made by adding the oil, with or without any miscible antiseptic constituents, as desired, and shaking or beating the same into an emulsion. This emulsion will remain exceedingly stable.

I have found that in an emulsion made with zinc hydroxide in the above manner, the amount of water in proportion to the amount of oil may be varied from a minimum of about 2 per-cent to a maximum of about 150 per cent. Beyond this point the emulsion becomes somewhat unstable. The emulsion may, therefore, be made very thin, which is particularly desirable as a thin solution enters the wood much more readily in the treating operation.

The emulsifying agent (zinc hydroxide in the above method) forms the oil and water into a water-in-oil emulsion as illustrated in the accompanying drawing. The oil 1 is the continuous phase and the water solution 2, formed into globules entirely surrounded by the oil, is the dispersed phase. It will, of course, be understood that other emulsifying agents can be used, such, for example, as magnesium oleate or lamp black. This agent can be used direct, that is without obtaining the same through a chemical reaction as in the above defined method.

I have found that an emulsion may be made with oil ranging from kerosene to the heaviest fuel oil. The viscosity and weight of the oil make some difference in the emulsion. As a rule, the light oils make larger globules of water solution such as shown in Fig. 1, this being with an oil of 28 gravity, while the heavier oils make finely dispersed particles of water solution as shown in Fig. 2, this being with an oil of 17 gravity. The heavier oil emulsion is believed to be considerably more desirable for various reasons, particularly since the same is more water proof and makes smaller water solution globules which are held more stable in the oil. In both Figs. 1 and 2, the emulsion is illustrated as magnified 100 diameters.

An emulsion of this type particularly adapted for treating railroad ties may, for example, contain the following ingredients by weight:

|                     | Per cent. |
| ------------------- | --------- |
| Oil                 | 37.1      |
| Cresylic acid       | 1.83      |
| Water               | 57.75     |
| Zinc chloride       | 2.89      |
| Ammonium hydroxide  | .43       |

This emulsion is made up of a 5 per cent solution of zinc chloride emulsified with a mineral oil having mixed therewith 5 per cent of cresylic acid, the emulsification to take place by the addition of ammonium hydroxide to form the emulsifying agent of zinc hydroxide. The percentage of cresylic acid and zinc hydroxide may be altered to suit other conditions, but the percentage above given is very suitable for railroad ties, which is one of the principal uses of the emulsion.

In the wood preservatives now in use the water soluble antiseptics readily leach out of the wood, the preserving effect on the wood thereby being lost. In my emulsion, these antiseptics in the water solution are entirely coated with a film of oil which retards such leaching action and retains the antiseptics in the wood for a longer period of time. Also, as stated above, the oil phase may always be made antiseptic if desired so that minute spores may not be able to make their way through the oil or the continuous phase of the emulsion.

Furthermore, in manufacturing my emulsion, advantage may be taken of the cost of the preservatives, either of oil miscible or water soluble, so as to make up preservative at the least possible cost according to the market prices of the components.

Having thus described my invention, what I claim and desire to secure by Letters Patent is:—

1. A wood preservative consisting of a water-in-oil emulsion wherein a water soluble antiseptic is contained within the water, and cresylic acid contained within the oil to act as an antiseptic to wood destroying fungi.

2. The process of forming a water-in-oil wood preserving emulsion which consists of adding oil and ammonium hydroxide to a water solution of zinc chloride to form an emulsion, zince hydroxide formed by the reaction of the zinc chloride and the ammonium hydroxide acting as an emulsifying agent therein to form a water-in-oil emulsion.

3. The process of forming a water-in-oil wood preserving emulsion which consists of providing a zinc chloride water solution and adding oil, cresylic acid, and ammonium hydroxide thereto to form an emulsion, zinc hydroxide formed by the reaction of the zinc chloride and ammonium hydroxide acting as an emulsifying agent therein to form a water-in-oil emulsion.

RALPH HOWARD HANDY.